(12) United States Patent
Yang et al.

(10) Patent No.: US 6,510,681 B2
(45) Date of Patent: *Jan. 28, 2003

(54) HIGH SPEED SICKLE CUTTING SYSTEM

(75) Inventors: Xinzhan Yang, LeClaire, IA (US); Max R. Bloom, St. Charles, IA (US); Gail I. Schwenke, Indianola, IA (US)

(73) Assignee: Alamo Group Inc., Seguin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/946,046

(22) Filed: Sep. 4, 2001

(65) Prior Publication Data

US 2002/0035827 A1 Mar. 28, 2002

Related U.S. Application Data

(63) Continuation-in-part of application No. 09/416,110, filed on Oct. 8, 1999, now Pat. No. 6,305,154.
(60) Provisional application No. 60/126,848, filed on Mar. 30, 1999.

(51) Int. Cl.[7] ............................................. A01D 34/13
(52) U.S. Cl. ............................. 56/298; 56/299; 56/307; 56/296
(58) Field of Search ............................ 56/289, 293, 296, 56/298, 299, 307, 308, 309, 310, 311

(56) References Cited

U.S. PATENT DOCUMENTS

| RE450 E | * | 4/1857 | Hussey | 56/299 |
|---|---|---|---|---|
| 513,834 A | * | 1/1894 | Smith | 56/299 |
| 2,590,788 A | * | 3/1952 | Novak | 56/307 |
| 2,619,787 A | * | 12/1952 | Mills et al. | 56/310 |
| 2,994,176 A | * | 8/1961 | Stroburg et al. | 56/298 |
| 3,199,279 A | * | 8/1965 | Yerke | 56/305 |
| 3,431,714 A | * | 3/1969 | Bouet | 56/296 |
| 3,698,171 A | * | 10/1972 | Hecht | 56/127 |
| 4,070,810 A | * | 1/1978 | Brakke | 56/291 |
| 4,103,556 A | * | 8/1978 | Niday | 56/296 |
| 4,198,803 A | * | 4/1980 | Quick et al. | 56/296 |
| 4,519,192 A | * | 5/1985 | Oppenhuisen et al. | 56/298 |
| 4,651,511 A | * | 3/1987 | Majkrzak | 56/310 |
| 4,702,064 A | * | 10/1987 | Hunter et al. | 56/310 |
| 4,750,321 A | * | 6/1988 | Klein | 56/298 |
| 4,854,114 A | * | 8/1989 | Speck | 411/169 |
| 5,694,754 A | * | 12/1997 | Shuknecht et al. | 56/298 |
| 5,979,152 A | * | 11/1999 | McCredie | 56/298 |

* cited by examiner

Primary Examiner—Thomas B. Will
Assistant Examiner—Nathan Mammen
(74) Attorney, Agent, or Firm—Michelle Evans; Gunn, Lee & Hanor, P.C.

(57) ABSTRACT

Sickle cutting systems of the type used in mowers and other harvesting machines. A sickle is shown consisting of 1½ inches blade spacing with serrated or smooth knife sections, a knifeback bar and a knife head, a plurality of knife or sickle guards with alternate long and short prongs or fingers spaced at two inches of any number that are mounted to the support bar of a mower, harvesting machine, or the like and provide a cutting surface for the sickle, adjustable hold-down clips that hold the knife sections down to the cutting surface, and a driving mechanism with a three-inch stroke such as a wobble joint, a pitman type, or other device which can convert rotary motion to reciprocating motion. In a second embodiment, a staggered sickle cutting system is provided that demonstrates the benefits of the sickle cutting system with even greater efficiency and reduces sickle stress and vibration.

10 Claims, 10 Drawing Sheets

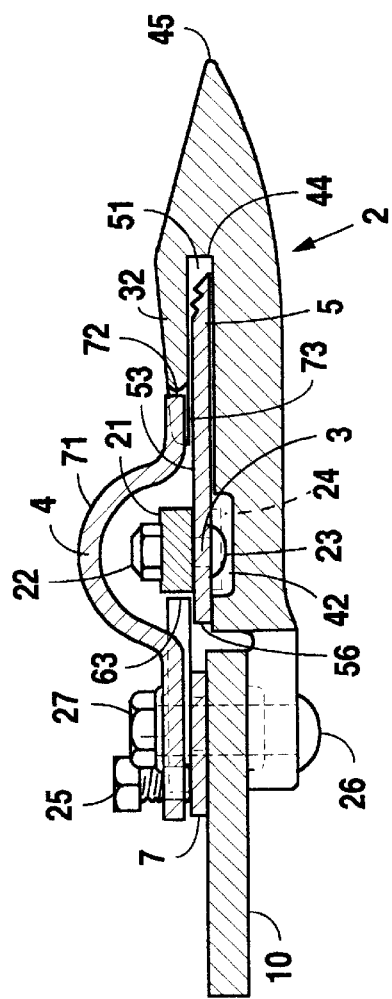
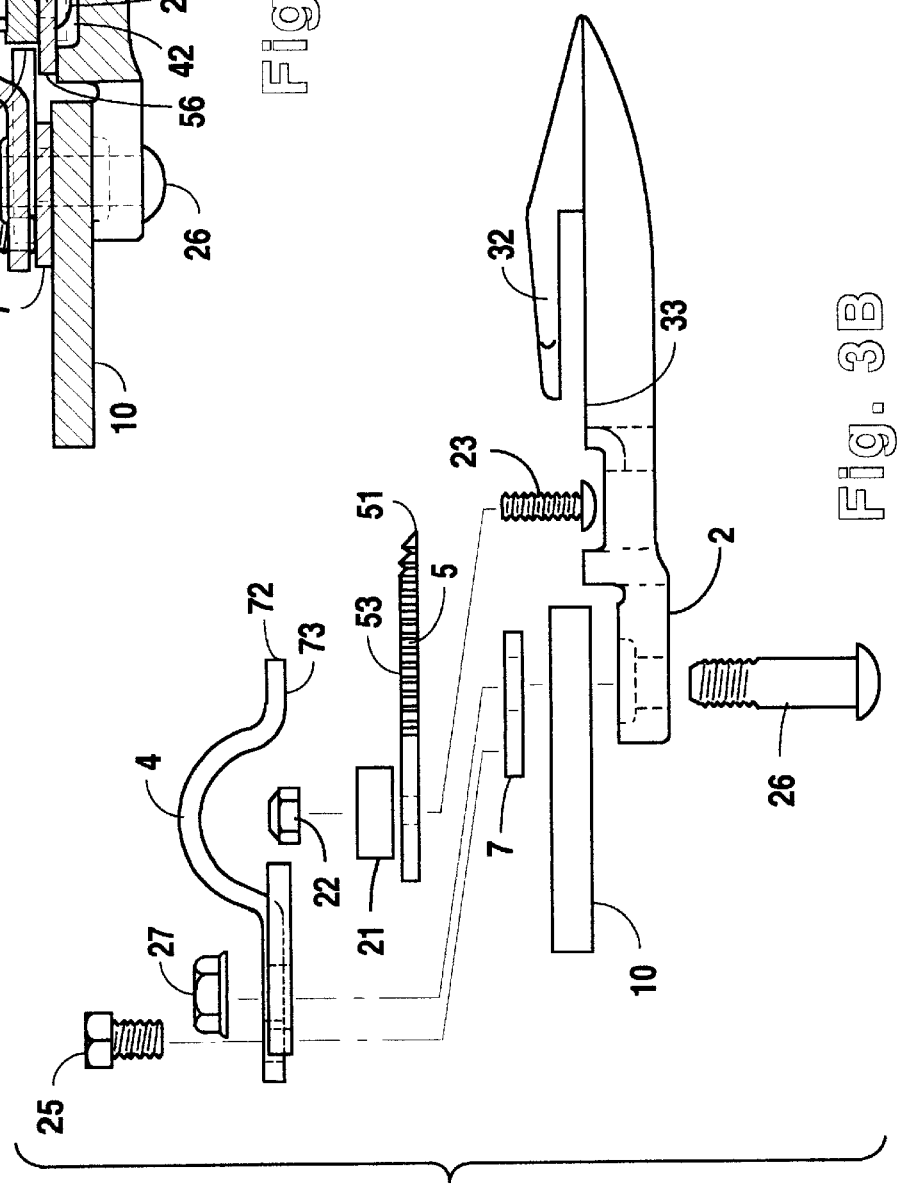
Fig. 3A
Fig. 3B

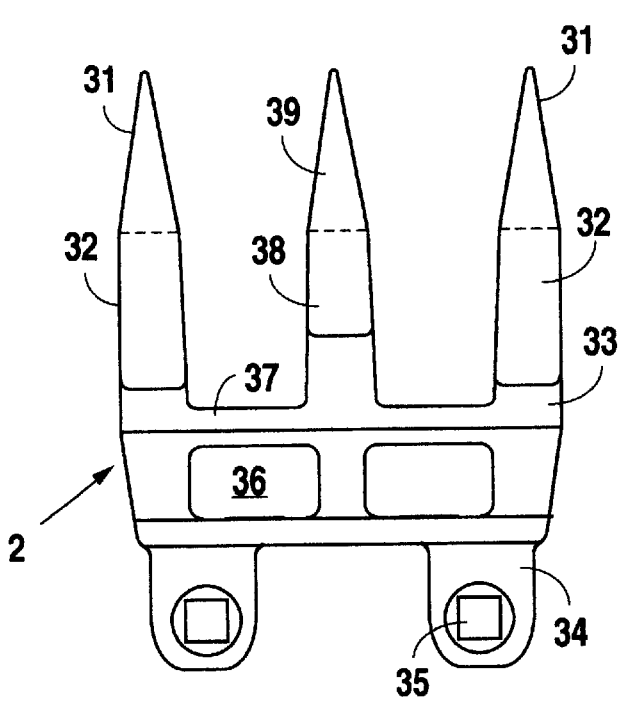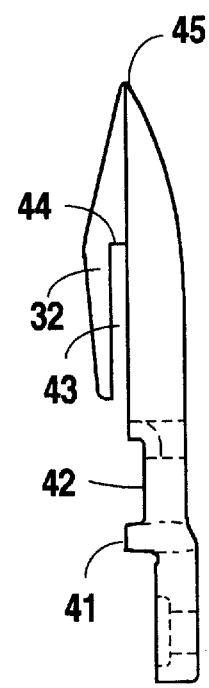
Fig. 4    Fig. 5
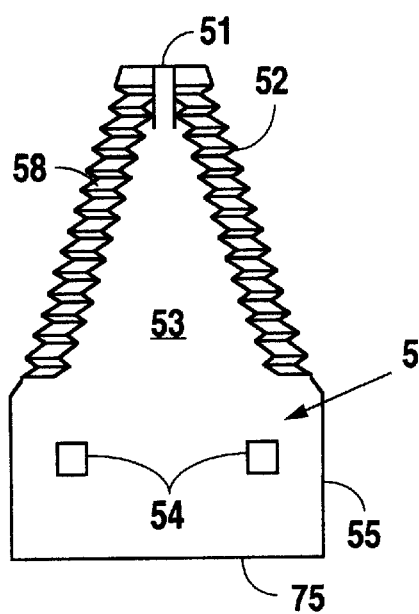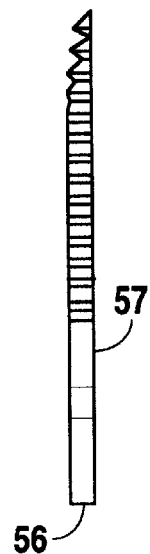
Fig. 6A    Fig. 6B

HIGH SPEED SICKLE CUTTING SYSTEM

This is a Continuation-in-part Application under 37 C.F.R. §1.53. Applicant claims priority under 35 U.S.C. §120 of U.S. application Ser. No. 09/416,110 filed Oct. 8, 1999, now U.S. Pat. No. 6,305,154, which claims priority under 35 U.S.C. §120 of U.S. Provisional Application Ser. No. 60/126,848 filed Mar. 30, 1999.

BACKGROUND OF THE INVENTION

1. Field of the Invention

The present invention relates to sickle bar mowers and crop-harvesting machine systems and more particularly, to a new cutting system designed and proven to improve cutting efficiency, speed, and quality. The new cutting system utilizes knife sections spaced less than three inches apart which reciprocate at approximately 2475 strokes per minute. The present invention provides a superior cutting efficiency and a higher maximum effective speed as compared to the sickle bar mower or crop harvesting machine of the prior art. A second embodiment of the present invention is in addition designed to reduce cutting vibration and stress.

2. Description of the Related Art

The standard or conventional sickle bar mower or crop-harvesting machine provides a sickle bar cutting system which further consists of a sickle with three-inch wide knife sections. The knife sections are placed adjacent to one another and three inches apart, as measured from one knife tip to the next, on a reciprocating sickle bar. Two-prong sickle guards are mounted to a stationary support bar located adjacent to the reciprocating sickle bar of the system. Stationary knife hold-down clips are also provided on the support bar. A driving mechanism that provides a three-inch reciprocating motion to the reciprocating sickle bar is also provided. Typically, the driving mechanism moves the sickle bar in a reciprocating motion at a speed of approximately 1,650 strokes per minute. Each knife section attached to the sickle bar moves between the stationary sickle guards which are overlaying the adjacent sickle bar and knife sections. The movement of the knife sections within overlaying sickle guards creates a shearing action. The sickle guards provide the base for the shearing action and also support and protect the sickle bar and knife sections as the sickle bar strokes. Commonly, the sickle guard fingers have a width of approximately 0.6 inches and the knife sections have a tip width of approximately 0.5 inches.

The standard knife velocity averages approximately 4.7 miles per hour and the maximum knife velocity is approximately 7.5 miles per hour. However, the standard sickle cutting system allows mowers, crop-harvesting machines, and the like to operate effectively at a maximum ground speed of approximately 4.5 to 5 miles per hour. The standard system can increase its maximum ground speed to approximately 8 miles per hour. However, the standard system cannot operate effectively at such a speed.

The sickle may be driven through a pitman rod attached to the sickle head by means of a ball-and-socket joint. Alternatively, a wobble-joint drive or hydraulic or pneumatic reciprocation means may be used to transform rotary motion to reciprocating motion in order to drive the sickle.

The standard sickle cutting system has limitations. First, three-inch knife sections push the crop sidewise to a three-inch spaced guard finger and cut the crop against the guard finger during only 1.25 inches of the three-inch stroke. The knife sections are idle during the rest of the stroke. This results in shocking effects, i.e. vibration and stress in the sickle drive. In addition, the three-inch stroke between sickle guards limits the travel speed of the machine. That is, if the ground speed of the cutting system exceeds the speed of the blade's reciprocation, crops being harvested will be pushed forward to a large degree before they are cut. This is due to the an accumulation of crop material between sickle guards which is occurring at a rate faster than the rate of cutting. From one sickle guard, the knife sections of the standard sickle cutting system must travel a distance of three inches before reaching an adjacent sickle guard and cutting crop material there against. Therefore, where the typical cutting system is operated at sufficiently high speeds, the end result is an accumulation of crop material between sickle guards prior to cutting which further results in a mashing and shattering the grain heads. Thus a significant portion of the crop may be lost when harvesting grains at sufficiently high speeds with the typical cutting system of the prior art.

Attempts have been made to improve the current sickle cutting system. However, no staggered cutting systems were found in the literature. U.S. Pat. No. 4,651,511 to Majkrzak employs a modified sickle guard system. The sickle guards come in two forms, long and short. The sickle guard fingers alternate between the long and the short variety on the sickle bar. The long sickle guard fingers, sized akin to other guard fingers of the prior art, are spaced three inches apart from one another while the shorter guard fingers are spaced there between. This leaves approximately one and one half inches of space between the short and long alternating sickle guards. While this does reduce the travel distance necessary for a knife section to cut crop material against adjacent guards and hence, reduces the sidewise pushing of crop stems as compared to the three-inch stroke system, the one and a half inch spacing tends to reduce cutting effectiveness. Again, the rate of reciprocation and the short guard fingers fail to prevent crop accumulation. As a result crop stems continue to accumulate and are pushed forward to a large degree out of the guards before cutting occurs. Additionally, plugging problems occur with heavy, dense, or vineal material such as large weeds or corn stalks.

The present invention is a new sickle cutting system that enables mowers, crop harvesters, and the like to cut hay, grain, and other crops more efficiently with respect to time and production. The invention provides a considerable reduction in grain loss. Stems are cut more cleanly rather than in aggregate which lessens shock to the crop. Further, if any shattering of grains does occur, the grains are likely to fall onto the combine head due to a higher possible ground speed of the cutting system. In a second embodiment of the present invention, a staggered sickle cutting system is provided that demonstrates the benefits of the sickle cutting system with even greater efficiency and in addition, reduces sickle stress and vibration.

SUMMARY OF THE INVENTION

The present invention is an improvement in sickle bar mower cutting systems of the types used in agricultural harvesting and mowing equipment. Ideally, this unique system comprises a sickle having knife sections uniformly spaced approximately two-inches from one another, as measured from their tips, on a knifeback bar. The knife sections may be smooth or serrated. A plurality of knife guards have sickle guard fingers thereon which are spaced at approximately two-inches from one another and match the spacing of the knife sections. The knife sections and guard fingers may be of any number. The knife guards are mounted to the support bar of a mower, crop harvesting machine, or the like. The sickle guard fingers of the knife guards provide a cutting surface for the sickle during its horizontal reciprocation. Adjustable hold-down clips enclose the knife sections within guard fingers and against the cutting surfaces thereof. The clips also provide a rear wear bar for the knifeback bar. Ideally, the high speed sickle system has, but is not limited to, a two-inch stroke driving mechanism that coverts rotary motion to reciprocating motion and drives the sickle at a speed of approximately 2475±10% stokes per minute (spm). The drive mechanism may be a wobble box, a pitman type, or other device including hydraulic and pneumatic reciprocating mechanisms that would provide the specified length and speed of stroke.

With a two-inch stroke ±10% and a speed of 2475±10% spm, this unique sickle cutting system has the same knife lateral speed as the standard three-inch sickle system. The knife sections travel two inches in one direction and cut the crops against a guard finger and then travel back and cut the crops against the adjacent guard finger. Rather than traveling three inches in one direction to cut crops against a guard finger, the knife sections need only travel a maximum of two inches. This enables mowers, crop harvesting machines, and the like to travel forward at a ground speed approximately 50% faster than standard systems while at the same time reducing crop stem accumulation by approximately 33%. It also results in more uniform, easier, and more efficient crop cutting. Further, the two-inch spacing allows a three-prong guard to fit existing standard cutter bars utilizing three inch spacing without modification thereof. That is, the standard guard having two fingers is simply replaced with a guard having three fingers.

This newly-designed, high-speed sickle cutting system has been tested under field conditions with different field crops and may be adapted to all known uses of sickle bar mowers used for cutting field crops and harvesting grain.

Table 1 shows the primary technical features of the high-speed sickle cutting system and a comparison to the standard or conventional three-inch sickle system.

TABLE 1

Primary Technical Information of the Sickle Cutting Systems

| FEATURE | HIGH-SPEED | CONVENTIONAL |
|---|---|---|
| Sickle Knife | *Two inch section | Three inch section |
| Sickle Guard | *Two inch spaced fingers | Three inch spaced fingers |
| Hold-Down Clip | Adjustable | Variable |
| Stroke Length | *Two Inch | Three Inch |
| Sickle Speed (spm) | *approximately 2475 (spm) | approximately 1650 (spm) |
| Peak Sickle Speed (mph) | approximately 7.4 (mph) | approximately 7.4 (mph) |
| Avg. Sickle Speed (mph) | approximately 4.7 (mph) | approximately 4.7 (mph) |
| Avg. Operating Speed (mph) | approximately 7 (mph) | approximately 4.5 (mph) |

*Two inches is the embodiment of the design as tested. However, a range of different conditions may apply, including spacing of 1-¾" to 2-¼" (approximately 2" ± 10%) and sickle stroke speed 2200–2700 spm (approximately 2475 spm ± 10%).

A second embodiment provides for a staggered cutting system that utilizes a three-inch stroke, two-inch guard finger spacing, and one and half-inch knife section blade spacing with the conditions of the preferred embodiment that allows the system to start cutting from the beginning of the stroke to the end of the stroke and cut 50% to 100% more than a conventional sickle system.

Another arrangement of the staggered cutting system is a combination of four and half-inch stroke, three-inch guard finger spacing, and two and one quarter-inch knife section blade spacing. Staggered cutting performance should be the same as the arrangement described above with exception that the three-inch guard finger spacing would not result in less sidewise pushing of crops than a conventional three-inch cutting system.

BRIEF DESCRIPTION OF THE DRAWINGS

FIG. 3a is a cross-sectional view of a segment of the sickle cutting system of the present invention.

FIG. 3b is a side separation view of a segment of the sickle cutting system of the present invention.

FIG. 4 is a top view of a two-inch spaced three-prong sickle guard.

FIG. 5 is a side view of the three-prong sickle guard with two-inch spacing.

FIGS. 6a and 6b are the top and side views of serrated knife sections of the system.

DESCRIPTION OF THE PREFERRED EMBODIMENT

Figure 1:
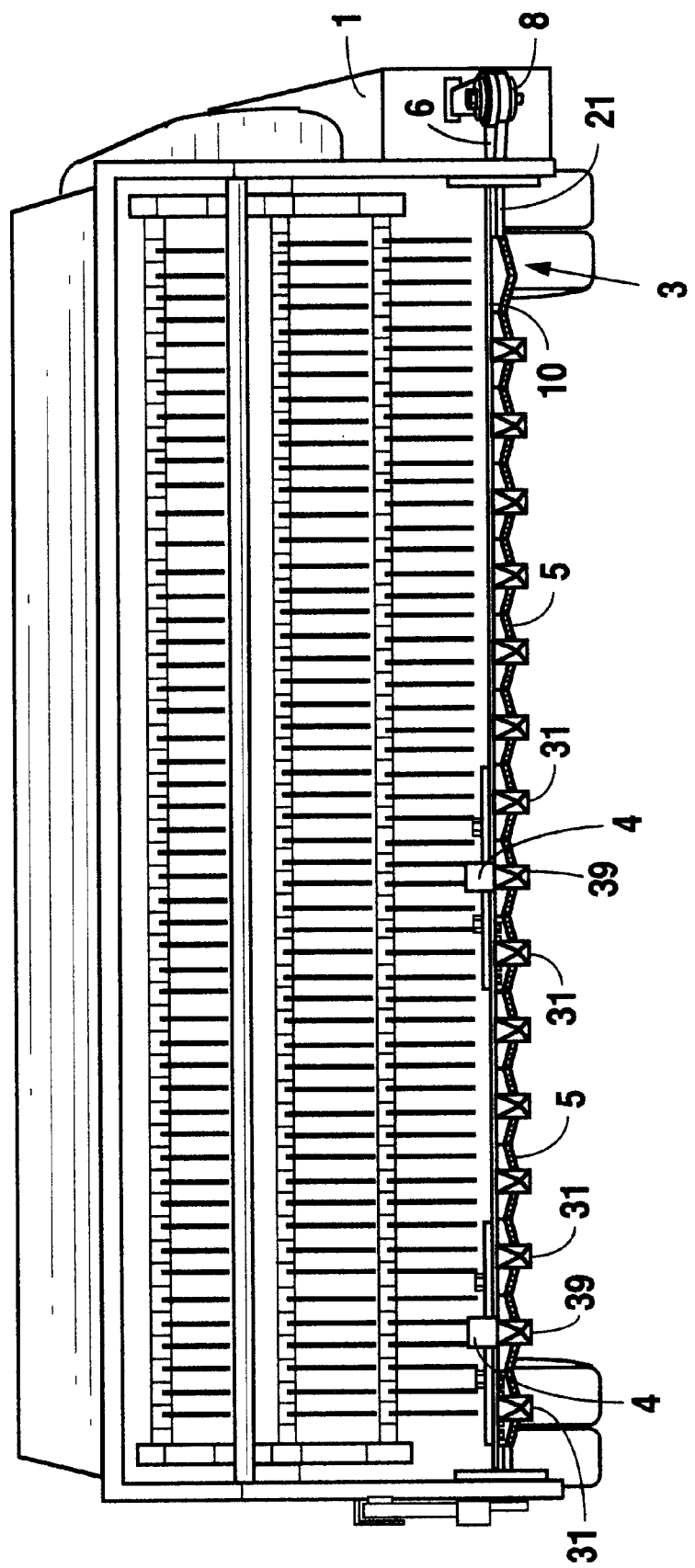
FIG. 1 is a perspective view of a sickle bar mower utilizing the sickle cutting system of the present invention.
Figure 2:
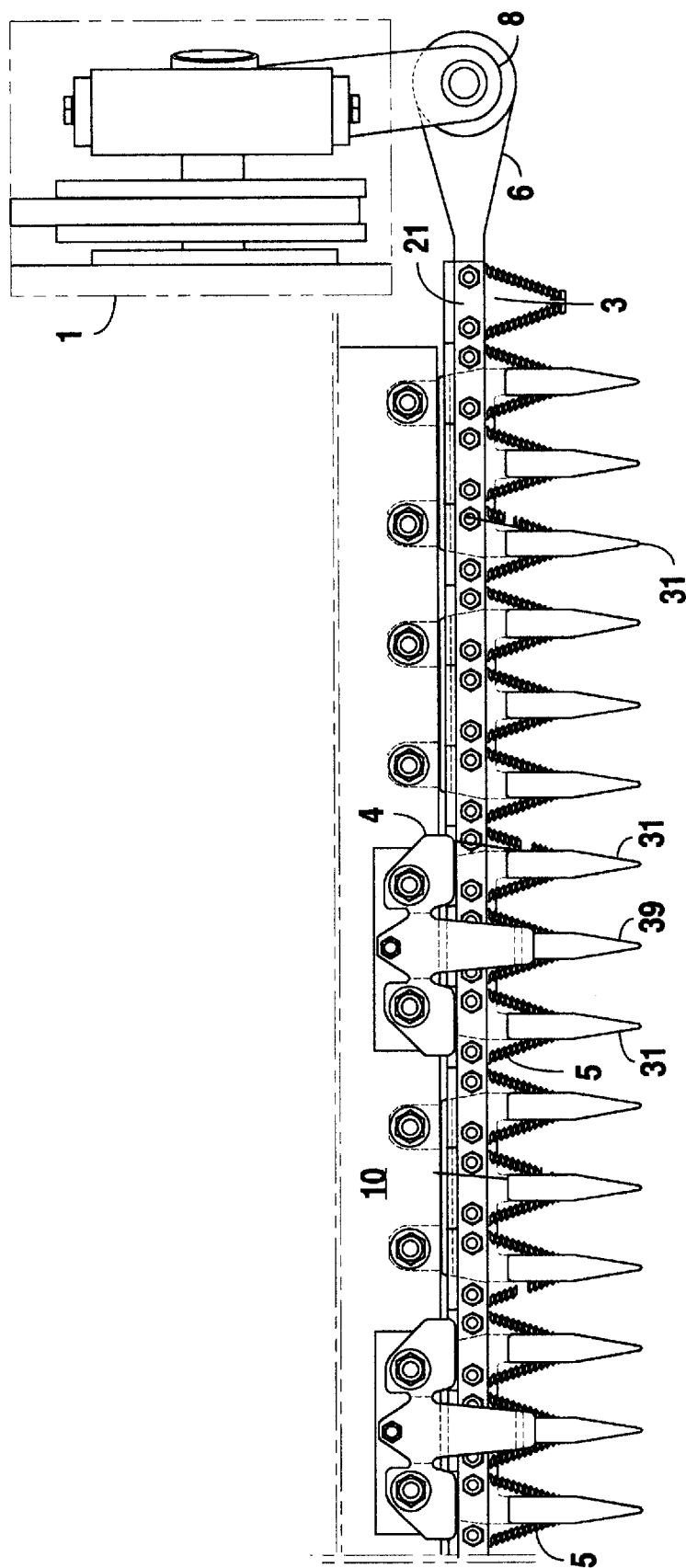
FIG. 2 is a top view of the unique sickle cutting system of the present invention.

Referring to FIG. 1, a sickle bar mower utilizing the sickle cutting system of the present invention is shown. The sickle bar mower is specially adept at cutting crops, including heavy, dense, or vineal material such as large weeds or corn stalks, at high ground speeds. The mower is shown with the sickle cutting system of the present invention including the sickle (3) its guard fingers (31, 39), sickle knife sections (5), and support bar (10). Referring to FIG. 2, a top view of the new sickle cutting system is shown. A sickle drive mechanism (1), such as a wobble joint or a pitman drive, is provided having a connecting rod (8). A sickle (3) is provided comprised of knife sections (5) and a knifeback bar (21) which is driven by the connecting rod (8) through its sickle head (6) which receives the connecting rod (8). The connecting rod (8) is thereby able to provide a two-inch stroke reciprocating motion to the sickle (3) at a speed of approximately 2475 strokes per minute.

The knife sections (5) approach two-inches in width at their base (75) (See FIG. 6A). The sickle knife sections (5) move back and forth and cut against the cutting surfaces (33) of the guard fingers (31, 39) of the sickle guards (2) (See FIG. 4). The guard fingers (31, 39) are arranged in groups of three on the sickle guards (2) (See FIGS. 3A, 3B). The guard fingers (31, 39) have two-inch spacing there between. The sickle guards (2) are mounted onto a support bar (10) of the sickle bar mower (See FIGS. 3A, 3B). An adjustable hold-down clip (4) with appropriate spacers (7) is installed on every other sickle guard (2) to maintain the correct cutting clearance between knife sections (5) and cutting surfaces (33) of the sickle guards (2) (See FIGS. 3A, 3B).

Referring to FIGS. 3A and 3B, cross-sectional and side separation views of the sickle cutting system are shown. The sickle guards (2) are secured to the support bar (10) of the mower with carriage bolts (26) and flanged locknuts (27). The adjustable hold-down clip (4) is mounted to the support bar (10) with the same carriage bolt (26) and locknut (27) used for mounting the sickle guard (2) to the support bar (10). An appropriate spacer (7) is secured between the hold-down clip (4) and the support bar (10) for the desired range of adjustment there between. An adjusting bolt with locking means (25) is threaded through the hold-down clip (4) and can be turned up or down against the spacer (7) so that clearance between the hold-down surface (73) of the hold-down clip (4) and the top surface (53) of the knife section (5) may be adjusted to the desired clearance there between. Each knife section (5) is bolted to the knifeback bar (21) with a second carriage bolt (23) and second locknut (22) or other appropriate fasteners.

Referring specifically to FIG. 3A, the knifeback bar (21) runs underneath an arc (71) of the hold-down clip (4) and against a wear bar (63) of the hold-down clip (4) when the sickle (3) is pushed backward by the crops. The sickle knife sections (5) run against the cutting surface (33) of the sickle guards (2) so that a shearing action to the crops is provided (See FIG. 3B). A retaining splice bar (24) is bolted to the knife sections (5) and the knifeback bar (21) using special bolts and locknuts or similar fasteners (not shown) at various locations inside a groove (42) of the sickle guards (2). The retaining splice bar (24) keeps the cutting tip (51) of the knife section (5) from moving forward and contacting the nose (44) of the guard (2).

Referring to FIGS. 4 and 5, a top view and a side view of the sickle guard (2) is shown with two-inch spacing between three sickle guard fingers (31, 39) attached thereto. The upper surface (34) and square holes (35) are for mounting the sickle guard (2) to the support bar (10) of a mower (See FIGS. 3A and 3B). The three sickle guard fingers (31,39) have rearward facing slots (43) with cutting surfaces (33) at the bottom thereof. Lips (32, 38) are at the top of each rearward facing slot (43). The center sickle guard finger (39) has a center lip (38) whereas outer lips (32) are provided in conjunction with the remaining guard fingers (31). The center lip (38) is shorter than the outer lips (32) so that the hold-down clip (4) can be applied above the sickle (3) at this location (See FIG. 3A). The lips (32, 38) support the crop when sickle knife is cutting against the cutting surfaces (33).

The guard fingers (31, 39) are pointed at the finger tips (45) so that they divide the crop and direct the stems between guard fingers (31, 39) rather than pushing the crop forward. The cutting surfaces (33) are leveled with a wear bar (63) which also serves to enclose a groove (42). The groove (42) keeps the retaining splice bar (24) from moving forward which could allow the cutting tip (51) of the knife section (5) to touch the nose (44) of the guard (2) (See FIG. 3A). Additionally, a trash bar (37) keeps crop debris from becoming lodged within inter-workings of the mower by providing rectangular holes (36) which allow debris to drop through the sickle bar system and onto the ground.

Referring to FIGS. 6A and 6B, top and side views of the two-inch wide knife section (5) are shown. The knife section (5) has square mounting holes (54) that provide easier and more secure fastening. The knife sections (5) are mounted to the sickle (3) and uniformly-spaced with each side (55) being snug but not tight against an adjacent side (55) of an adjacent section (not shown). These two-inch knife sections (5) have two cutting edges (58) a piece. The cutting edges (58) may have between 7 and 14 teeth (52) per inch, as measured parallel to the heel (56) of the knife section (5). Alternatively, the cutting edges (58) may be smooth for some applications. Both cutting edges (58) have an angle of approximately 19 degrees ±20% with reference to the sides (55) of the knife section (5). When installed, the cutting tip (51) will have clearance from the nose (44) of the sickle guard (2) and the heel (56) will have clearance from the support bar (10) of the mower (See FIG. 3A). The top surface (53) may be secured as desired by a hold-down clip (4) so that the bottom surface (57) will run against the cutting surface (33) of the sickle guard (2) (See FIG. 3A).

Figure 7:
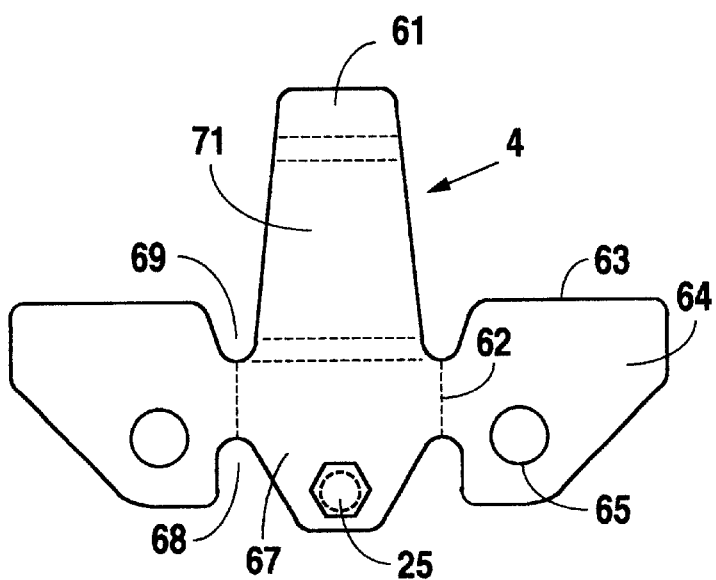
FIG. 7 is a top view of the adjustable hold-down clip.
Figure 8:
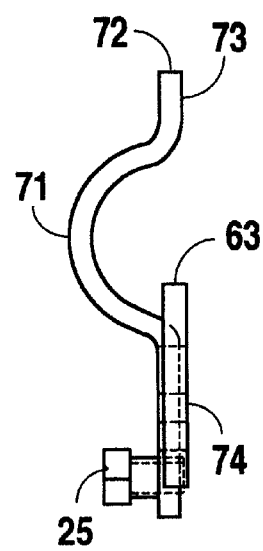
FIG. 8 is a side view of the adjustable hold-down clip.
Figure 9G:
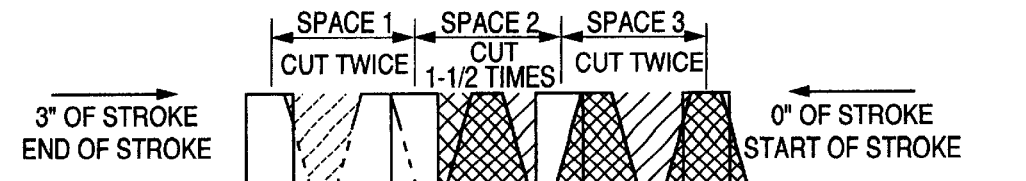
FIG. 9 is a diagram of the working theory of the second embodiment of the present invention.
Figure 9F:
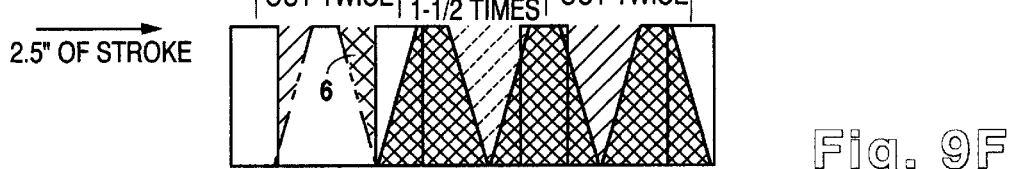
Figure 9E:
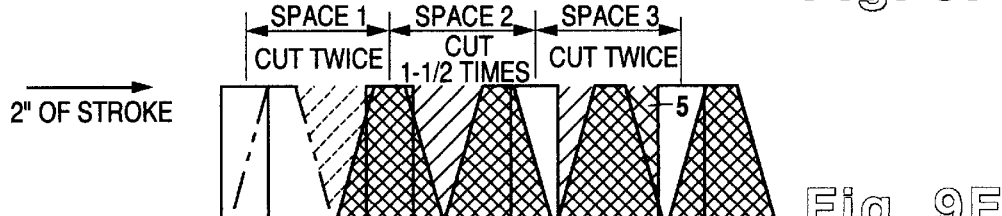
Figure 9D:
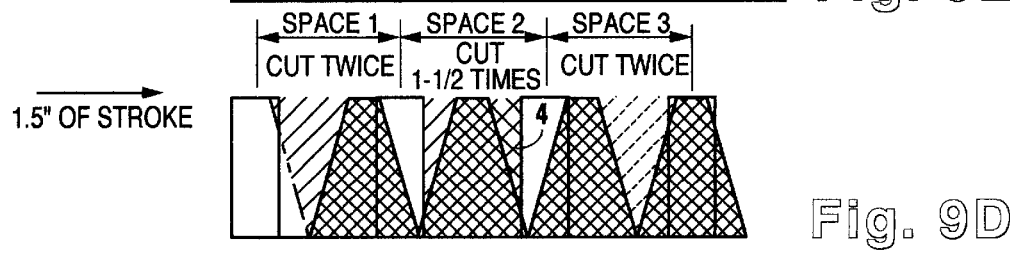
Figure 9C:
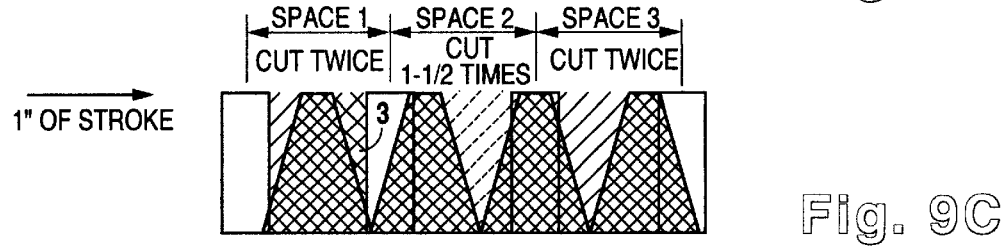
Figure 9B:
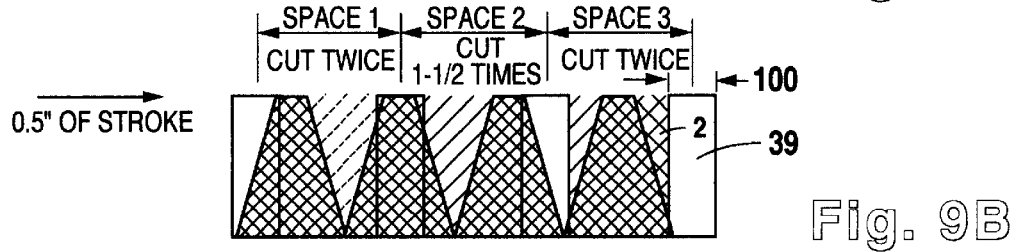
Figure 9A:
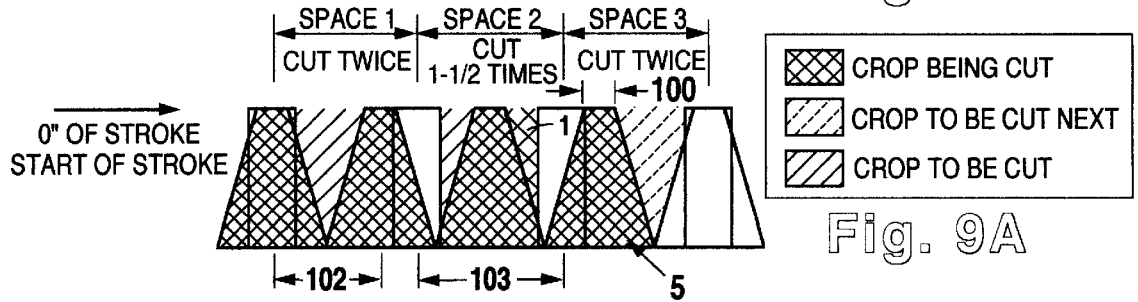

Referring to FIGS. 7 and 8, a top view and a side view of the hold-down clip (4) are shown. The hold-down clips (4) are mounted through circular holes (65) in mounting plates (64) onto the support bar (10) of the mower using the same carriage bolt (26) and flanged lock nut (27) used to mount the sickle guard (2) to the support bar (10) (See FIG. 3B). Between a mounting surface (74) and the support bar (10) there may be a spacer (7) to provide appropriate thickness (See FIG. 3B). The up and down movement of the forward end (61) of the hold-down clip (4), which occurs as the adjusting bolt with locking means (25) is turned, will give an adjustable setting for the clearance between the hold-down surface (73) of the hold down clip (4) and the top surface (53) of the knife section (5) (See FIG. 3A). The wear bar (63), which the knifeback bar (21) of the sickle (3) runs against, provides a wearing and positioning surface (See FIG. 3A). The arc (71) is over the knifeback bar (21) and the flanged lock nuts (27) and carriage bolts (26) for the knife sections (5) (See FIG. 3A). The terminal end (72) of the hold-down clip (4) is next to, but clear of, the lip (38) of the center finger (39) of the sickle guard (2) (See FIG. 3A).

In a second embodiment of the present invention, a staggered cutting system is provided. FIGS. 9A–9G, show the working theory of the second embodiment with a guard finger width (101) of 0.6 inch and a section blade tip width (100) of 0.4 inch. The cutting starts in region 1 at FIG. 9A as soon as the stroke begins, following are regions 2, 3, 4 and 5 in FIGS. 9B–9F respectively and ends when region 6 finishes in FIG. 9G. It continues cutting throughout the whole three-inch stroke, evens the stress on the sickle drive and reduces shocking. The sickle section blades cut crops against guard fingers (31, 39 FIG. 14A) with guard finger spacing (103) of 2 inches and have less sidewise pushing than a conventional three-inch system, and cut twice between two-third of the guard fingers and one-and-half times between one-third of the guard fingers. This enables mowers, crop harvesting machines, and the like to travel forward at a faster ground speed than a conventional three-inch system and cut more uniform, easier, and better. The guard fingers are arranged long and short alternately so that there is a four-inch spacing between any two adjacent long fingers of the sickle guards. This wide spacing allows hay and other crops to flow to the cutter bar more easily and reduces the tendency of plugging which may be caused by large crop stems or balls of wet or dead grass. Further, the two-inch spacing would allow a three-prong guard to fit existing cutter bars without modification of the standard mounting bars, which are made for three-inch spacing.

Figure 10:
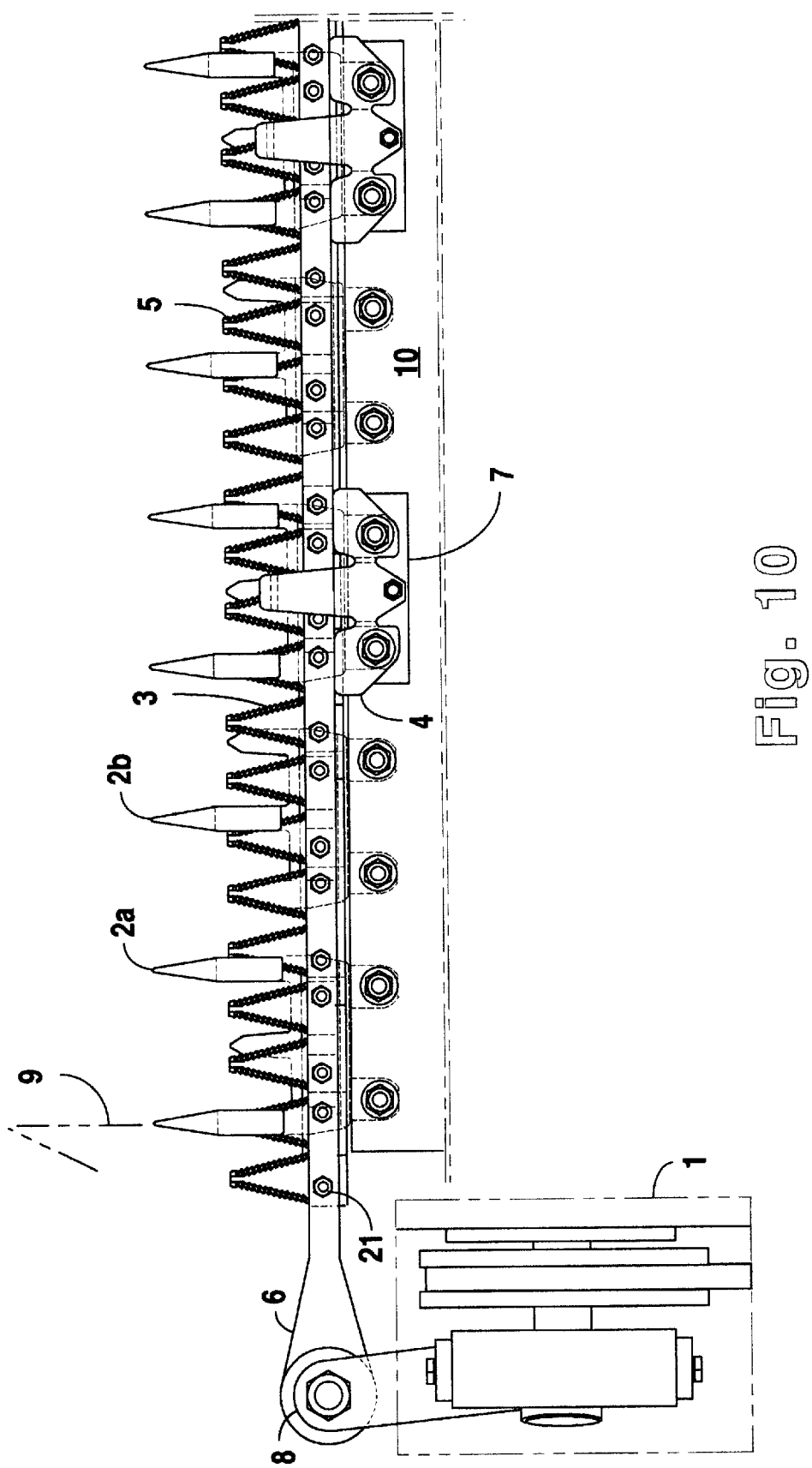
FIG. 10 is a top view of the staggered sickle cutting system of the second embodiment of the present invention.
Figure 11:
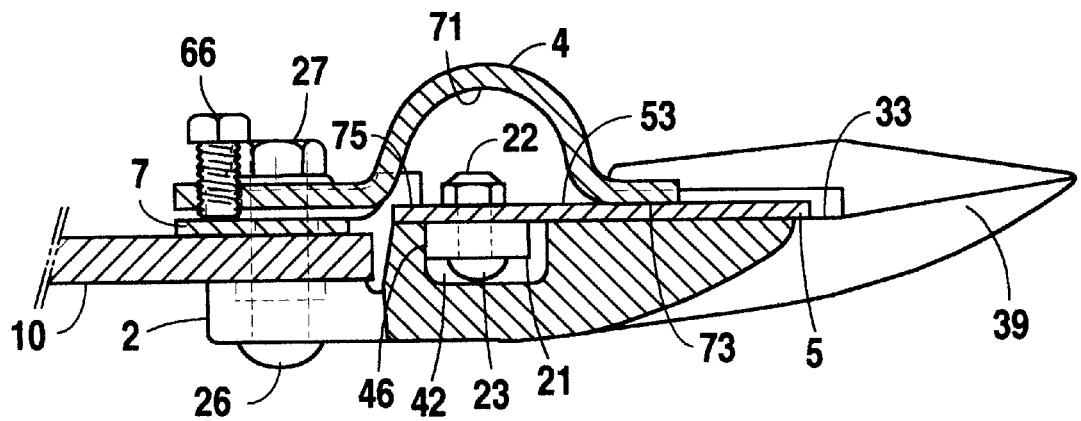
FIG. 11 is a cross-sectional view of the cutter bar of the second embodiment of the present invention.

Referring to FIG. 10, there is shown a top view of the staggered cutting system of this embodiment. A sickle drive mechanism (1) such as a wobble joint, a pitman type, or other device having a drive arm or connecting rod (8) which provides a three-inch stroke reciprocating motion to the sickle (3). A sickle head (6) connects the drive mechanism rod (8) and the sickle (3). The sickle sections (5) which have knife blades with a spacing (102) of 1.5 inches move back and forth and cut against the cutting surface of the sickle guards (2a and 2b) that have three fingers, two long and one short (2a) or one long and two short (2b), with two-inch finger spacing. The sickle guards (2a and 2b) are mounted alternately onto a common support bar (10) of a mower, crop harvester, or the like so that there is a four-inch spacing between any two adjacent long fingers to reduce the tendency of crop plugging. An adjustable sickle hold-down clip (4) with possibly an appropriate spacer (7) are installed on every other sickle guard to maintain the correct cutting clearance between knife sections (5) and the cutting surface of the guards (2a and 2b). Also shown is the left-hand side divider or skid shoe (9) of a mower or the like. Referring to FIG. 11, a cross-sectional view of the sickle cutter is shown. The sickle guards (2) are secured to a support (10) of a mower, crop harvester, or the like with carriage bolts (26) and flanged locknuts (27) or other appropriate fasteners. The adjustable hold-down clip (4) uses the same fasteners (26) and (27) for mounting to the support bar (10) with possibly an appropriate spacer (7) in between for the desired range of adjustment. The adjusting bolt with locking means (66) in the hold-down clip (4) can be turned down or up against the spacer (7) or the support bar (10) so that clearance between the hold-down surface (73) of the clip (4) and top surface (53) of the knife section (5) changes to obtain a desired clearance. The surface (75) of the hold-down clip (4) also provides a hold-down action onto the heels of the knife sections. The knife sections (5) are bolted to a knifeback bar (21) with ribbed-neck bolts (23) and locknuts (22) or other appropriate fasteners. The knifeback bar (21) runs inside the groove (42) and against the wear bar (46) of the guards (2) when the sickle is pushed backward by the crops. The knife sections (5) run against the cutting surface (33) of the guards (2) so that a shearing action to the crops is provided.

Figures 12, 13:
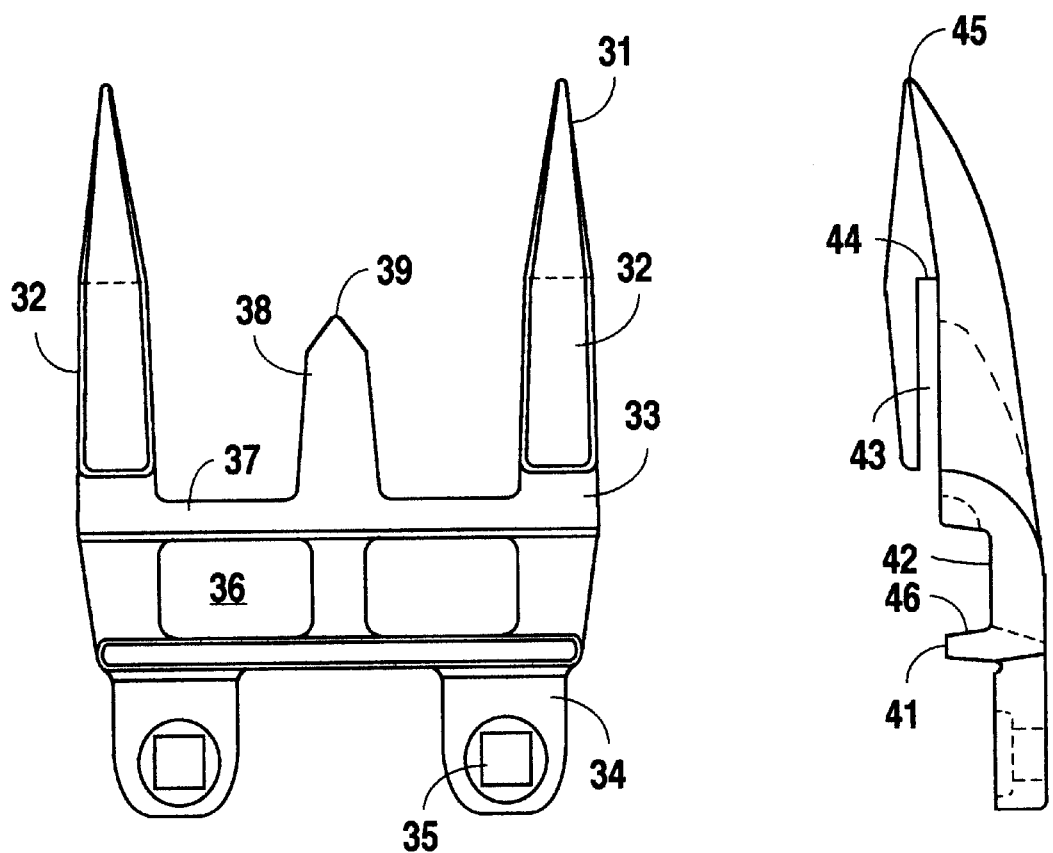
FIG. 12 is a top view of the three-prong sickle guard which has long-short-long fingers spaced at two inches of second embodiment.
FIG. 13 is a side view of the three-prong sickle guard with long-short-long fingers spaced at two inches of second embodiment.

Referring to FIG. 12 and FIG. 13, there are shown a top view and a side view of the three-prong sickle guard (2a) with long-short-long fingers at two-inch spacing which is one specific arrangement of many possible designs that have, but are not limited to, two-inch spacing between any two adjacent fingers of the sickle guards mounted to the support bar of a mower or the like. The mounting surface (34) and three-inch spaced holes (35) are for mounting the guard to the support bar of a mower or the like. The longfingers or prongs (31) have rearwardly facing slots (43) that have a cutting surface (33) at the bottom of the slot (43) and lip (32) is at the top of the slot (43). The center or short finger (38) has no lip and its surface, cutting surface, is leveled with surface (33) so that the hold-down clip can be applied above the sickle at this location and that the knife sections can cut any crops that hang over the guard finger or at the fingertip. The lips (32) support the crop when sickle knife is cutting against the guard cutting surface (33). The fingers are pointed at the tip (45) (39) so that they divide the crop and direct the stems between fingers rather than pushing the crop forward. The cutting surface (33) is leveled with the wear and support bar (41). The groove (42) is to keep the sickle or the knife back bar from moving forward that may allow the tip of the knife section to touch the nose (44) of the guard. The trash bar (37) is to keep the trash that is created through cutting or debris from going into the mower, grain harvester, or the like. The holes (36) will allow trash to drop through the bar to the ground.

Figure 14A:
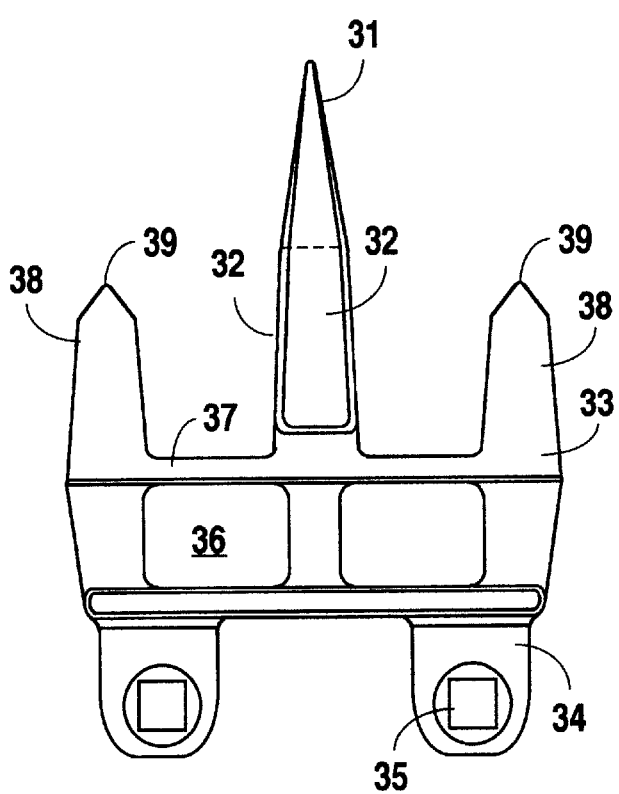
FIGS. 14a and 14b are the top and side views of the three-prong sickle guard with short-long-short fingers spaced at two inches of second embodiment.
Figure 14B:
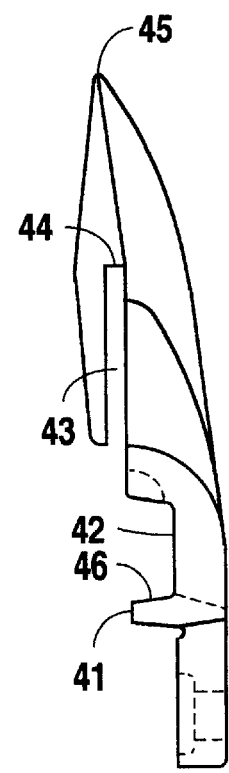

Referring to FIG. 14a and FIG. 14b, there are shown a top view and a side view of the three-prong sickle guard (2b) with short-long-short-fingers at two-inch spacing. The long finger is the same as the long fingers of the guard with long-short-long fingers (2a) and the short fingers are the same as the short finger of the guard with long-short-long fingers (2a). Beside the finger arrangement, the two sickle guards (2a and 2b) are identical. The sickle guards (2a and 2b) are installed alternately onto the support bar of a mower or the like so that there is a four-inch spacing between any two long fingers. This larger opening allows the crops to flow easily to the cutter bar of a mower or the like and reduces the tendency of plugging that may be caused by large crop stems or balls of wet or dead grass.

Figure 15A:
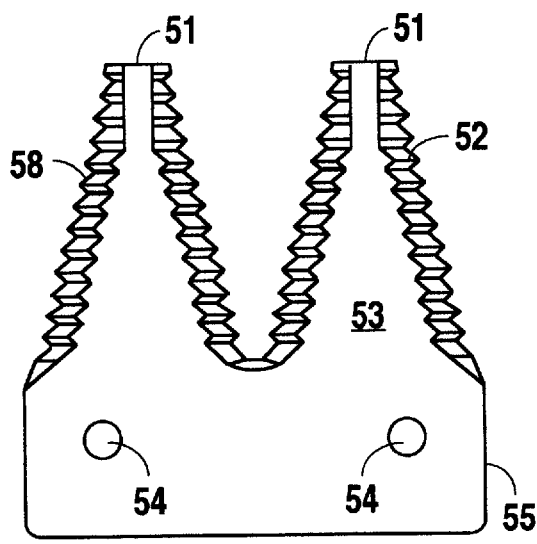
FIGS. 15a and 15b are the top and side views of the twin-blade and three-inch wide serrated knife section with one and half-inch blade spacing of second embodiment.
Figure 15B:
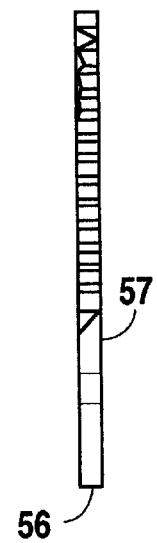

Referring to FIG. 15a and FIG. 15b, a top view and side view of the knife section show the knife section having twin blades at 1.5 inch spacing with round mounting holes (54). The sections are to be mounted to the sickle uniformly spaced so that the sides (55) will be snug but not tight against the side of the next section. These 1.5-inch spaced knife blades have, but not limited to, 7 to 14 teeth (52) per inch parallel to the heel (56) or they may be smooth sided for some applications. Both cutting edges (58) have an angle of approximately 15 degrees±10% with reference to the sides (55). When installed, the tip (51) will have clearance from the nose of the sickle guard and the heel (56) will have clearance from the support bar of the mower or the like. The top surface (53) may be secured as desired by a hold-down clip so that the bottom surface (57) will run against the cutting surface of the sickle guard.

Figure 16:
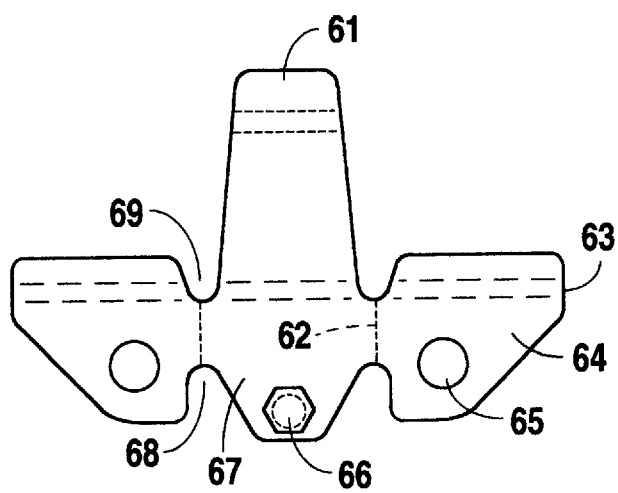
FIG. 16 is the top view of the adjustable hold-down clip of second embodiment.
Figure 17:
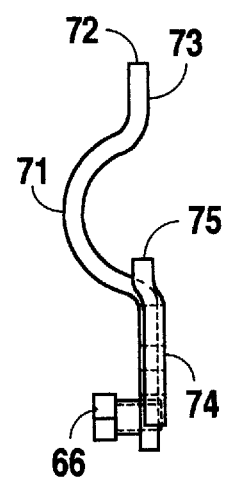
FIG. 17 is the side view of the adjustable hold-down clip of second embodiment.

Referring to FIG. 16 and FIG. 17, there are shown a top view and a side view of the adjustable hold-down clip. The clips are mounted through holes (65) in the mounting plates (64) onto the support bar of the mower or the like using the same fasteners as for the sickle guard. Between the mounting surface (74) and the support bar, there may be a spacer used for appropriate thickness. The center segment (67) and the arc (71) are formed higher than the mounting plates (64) which gives space for the arc (71) and the lip (61) to pivot along (62) when the bolt (66) is adjusted up or down. Notches (68) and (69) make the pivoting easier. The up and down movement of the lip (61) when the bolt (66) is turned will give an adjustable setting for the clearance between the hold-down surface (73) and the top of the knife section. The hold-down ear (63) or the surface (75) is formed higher than the mounting surface (74) and above the section heels when installed, that provides a hold-down action atop the heels of the knife sections. The arc (71) has clearance over the sickle head (6) and over the section bolts and nuts.

There are various sickle bar systems which precede the present invention. However, none is capable of the efficiency and overall rate of cutting of the present invention. This is due to the combination of the size and spacing of the invention's parts in conjunction with the rate of reciprocation of the sickle (3) among other features.

Various modifications of the preferred design may be made and remain within the scope of the design. For example, the holes for fasteners, the length, type, number, and quantity of the fasteners, the reciprocating mechanism, and the like may be of interchangeable types. The length, width, shape, spacings, and speeds of components may be varied. Such modifications are contemplated as being within the scope of claimed coverage and respective equivalents.

We claim:

1. A high speed staggered sickle cutting system for a sickle bar mower comprising a plurality of knife sections having cutting tips with less than three inches of distance there between, said plurality of knife sections further comprising individual knife sections with bases secured to a knifeback bar and having cutting tips;

a plurality of sickle guard fingers having finger tips with less than three inches of distance there between;

holes within said plurality of sickle guard fingers for securing said plurality of sickle guard fingers to a support bar;

individual sickle guard fingers comprising said plurality of sickle guard fingers, said individual sickle guard fingers resting adjacent and parallel to said individual knife sections, said support bar being adjacent to and separate from said knifeback bar;

a sickle drive mechanism having a connecting rod with a sickle head attached to said knifeback bar, said sickle drive mechanism capable of reciprocating said knifeback bar with a stroke of between 3.00 inches and 4.50 inches and compatible with said plurality of knife sections and said plurality of sickle guard fingers;

a hold down clip attached to said support bar opposite an individual sickle guard finger and adjacent to an individual knife section;

a plurality of triads of individual sickle guard fingers comprising said plurality of sickle guard fingers, said plurality of triads of individual sickle guard fingers having a unified body further comprising a center individual sickle guard finger, a left individual sickle guard finger, and a right individual sickle guard finger, and said plurality of triads comprising alternating triads of long-short-long and short-long-short sickle guard fingers; and a rearward facing slot of said left and said right individual sickle guard fingers in said long-short-long triad further comprising a cutting surface at the bottom of said slot and a lip at the top of said slot, said lip supporting the crop when said knife sections cut against a guard cutting surface; and wherein said center individual sickle guard finger is leveled with said cutting surface so said hold down clip can be applied above said sickle at this location and said knife sections can cut any crops that hang over said sickle guard fingers or finger tips.

2. The high speed staggered sickle cutting system of claim 1, further comprising a rearward facing slot of said center individual sickle guard finger in said short-long-short triad.

3. The high speed staggered sickle cutting system for a sickle bar mower of claim 1 further comprising a groove within said individual sickle guard finger for accommodating a knifeback bar attached to and underlying said individual knife section, said hold down clip having an arc for clearance over said knifeback bar; and a spacer underlying said hold down clip to help provide adequate clearance between said hold down surface and said top surface.

4. The high speed staggered sickle cutting system for a sickle bar mower of claim 3 wherein said sickle guard further comprises a wear bar, said wear bar capable of contacting said knifeback bar to help prevent excess rearward movement of said individual knife section, a splice bar and said groove capable of contacting one another forwardly and rearwardly and acting in concert to prevent excess rearward and forward movement of said individual knife sections.

5. The high speed staggered sickle cutting system for a sickle bar mower of claim 1 wherein said triad of individual sickle guard fingers is equipped with a trash bar adjacent to said support bar, said trash bar further comprising holes to allow debris to pass through said high speed sickle cutting system without disrupting any integral-working parts thereof.

6. The high speed staggered sickle cutting system for a sickle bar mower of claim 5 wherein said cutting edges originate at one of said bases and approach one another at an angle of between 5° and 25° eventually terminating in one of said cutting tips.

7. The high speed staggered sickle cutting system for a sickle bar mower of claim 6 wherein said cutting edges are non-serrated.

8. The high speed staggered sickle cutting system for a sickle bar mower of claim 6 wherein said cutting edges are serrated with teeth.

9. The high speed staggered sickle cutting system for a sickle bar mower of claim 8 wherein a base terminates at a heel running parallel to said knifeback bar, said teeth being between seven and fourteen in number per inch as measured parallel to said heel.

10. The high speed staggered sickle cutting system for a sickle bar mower of claim 1 wherein the distance between said finger tips is between 1.75 inches and 3.00 inches.

* * * * *